(12) United States Patent
Xu (10) Patent No.: US 12,223,296 B2
(45) Date of Patent: Feb. 11, 2025

(54) MICRO-FRONT-END-BASED PAGE INTERNATIONALIZATION CONFIGURATION METHOD AND APPARATUS, DEVICE, AND MEDIUM

(71) Applicant: SUZHOU METABRAIN INTELLIGENT TECHNOLOGY CO., LTD., Jiangsu (CN)

(72) Inventor: Lei Xu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/571,884

(22) PCT Filed: Feb. 25, 2022

(86) PCT No.: PCT/CN2022/078101
§ 371 (c)(1),
(2) Date: Dec. 19, 2023

(87) PCT Pub. No.: WO2023/050703
PCT Pub. Date: Apr. 6, 2023

(65) Prior Publication Data
US 2024/0264811 A1 Aug. 8, 2024

(30) Foreign Application Priority Data
Sep. 28, 2021 (CN) .......................... 202111141569.6

(51) Int. Cl.
G06F 8/38 (2018.01)
G06F 40/40 (2020.01)

(52) U.S. Cl.
CPC .............. *G06F 8/38* (2013.01); *G06F 40/40* (2020.01)

(58) Field of Classification Search
CPC .................................. G06F 8/38; G06F 40/40
See application file for complete search history.

(56) References Cited

U.S. PATENT DOCUMENTS

| 8,843,360 B1 * | 9/2014 | Johnston ................. G06F 9/454 715/236 |
| 10,078,504 B1 | 9/2018 | Franovic |

(Continued)

FOREIGN PATENT DOCUMENTS

| CN | 105138350 A | 12/2015 |
| CN | 108885544 A | 11/2018 |

(Continued)

OTHER PUBLICATIONS

International Search Report of Corresponding International Patent Application No. PCT/CN2022/078101, mailed Jun. 28, 2022.
Written Opinion of International Searching Authority of Corresponding International Patent Application No. PCT/CN2022/078101, mailed Jun. 28, 2022.

(Continued)

*Primary Examiner* — Wei Y Zhen
*Assistant Examiner* — Amir Soltanzadeh
(74) *Attorney, Agent, or Firm* — Cooper Legal Group, LLC (57) ABSTRACT

The present application relates to the technical field of computers, and discloses a micro-front-end-based page internationalization configuration method and apparatus, a device and a medium. The method includes: creating an internationalized page in a micro-front-end main application, and configuring the internationalized page to obtain a configured internationalized page; persisting data in the configured internationalized page; and reading the data and transmitting the data to at least one micro-front-end sub-application for any one of the micro-front-end sub-applications to perform page translation according to the data.

16 Claims, 4 Drawing Sheets

(56) References Cited

U.S. PATENT DOCUMENTS

| | | | | |
|---|---|---|---|---|
| 2009/0276206 A1* | 11/2009 | Fitzpatrick | ............... | G06F 40/40 |
| | | | | 715/770 |
| 2018/0300218 A1* | 10/2018 | Lipka | ...................... | G06F 40/40 |
| 2018/0307683 A1* | 10/2018 | Lipka | ...................... | G06F 9/454 |
| 2023/0062336 A1* | 3/2023 | Abraham | ................. | G06F 9/454 |
| 2023/0086308 A1* | 3/2023 | Lim | ........................ | G06F 40/14 |
| | | | | 715/234 |

FOREIGN PATENT DOCUMENTS

| | | |
|---|---|---|
| CN | 109683998 A | 4/2019 |
| CN | 111427641 A | 7/2020 |
| CN | 112162813 A | 1/2021 |
| CN | 112612448 A | 4/2021 |
| CN | 113590185 A | 11/2021 |

OTHER PUBLICATIONS

Corresponding Chinese Patent Application No. 202111141569.6, First Office Action, dated Nov. 12, 2021.

Corresponding Chinese Patent Application No. 202111141569.6, Notification for Grant, dated Dec. 17, 2021.

"Implementing Resource Internationalization of Frontend Pages Based on jQuery.i18n.properties", https:/blog.csdn.net/aixiaoyang168/article/details/49336709, Xiaoyang 168, pp. 1-6, Oct. 22, 2015.

Guodong~(Literal translation, Unknown name), "Internationalization of web pages, switching between Chinese and English on web pages, internationalization of vue projects—detailed usage of vue-i18n", «https://blog.csdn.net/ weixin_48653480/article/details/109114856»,pp. 1-6, Oct. 16, 2020.

Qianduan(Literal translation, Unknown name), "How to elegantly achieve front-end internationalization", «https://zhuanlan.zhihu.com/p/79165787», pp. 1-9, Aug. 21, 2019.

* cited by examiner

MICRO-FRONT-END-BASED PAGE INTERNATIONALIZATION CONFIGURATION METHOD AND APPARATUS, DEVICE, AND MEDIUM

This application claims priority to Chinese Patent Application No. 202111141569.6, filed on Sep. 28, 2021 in China National Intellectual Property Administration and entitled "MICRO-FRONT-END-BASED PAGE INTERNATIONALIZATION CONFIGURATION METHOD AND APPARATUS, DEVICE, AND MEDIUM", the entire contents of which are incorporated herein by reference.

FIELD

The present application relates to the technical field of computers, in particular to a micro-front-end-based page internationalization configuration method and apparatus, a device, and a medium.

BACKGROUND

A micro-front-end architecture is a Web front-end architecture similar to microservice. The micro-front-end architecture applies a concept of the microservice to front-end development, which transforms Web applications from a single monomer application into an application formed by aggregating multiple small front-end applications. Each front-end application may be independently developed, deployed, and run, which improves flexibility of a software system and also improves development and maintenance efficiency of the software system.

Page internationalization means that a page may be switched between Chinese displaying and English displaying. At present, an implementation method for the page internationalization is to establish a multilingual configuration file in an application, then select a corresponding configuration file as a basis according to a language environment when a page in the application is loaded, and translate keywords on the page.

In the micro-front-end architecture, each sub-application has its own internationalization file. This scheme may result in a duplicate configuration of same words between different sub-applications or a problem of inconsistent translations of the same words. Furthermore, a certain entry in a production environment may only be modified by means of code modification, repackaging, and redeployment, so that it is very cumbersome and extremely hard to maintain.

SUMMARY

Technical solutions according to embodiments of the present application are as follows:

In a first aspect, embodiments of the present application provide a micro-front-end-based page internationalization configuration method. The above method includes:
creating an internationalized page in a micro-front-end main application, and configuring the internationalized page to obtain a configured internationalized page;
persisting data in the configured internationalized page; and
reading the data and transmitting the data to at least one micro-front-end sub-application for any one of the micro-front-end sub-applications to perform page translation according to the data.

According to one or more embodiments of the present application, the creating an internationalized page in a micro-front-end main application, and configuring the internationalized page to obtain a configured internationalized page includes:
creating the internationalized page in the micro-front-end main application;
acquiring at least one entry from the internationalized page, and configuring a plurality of attributes to each of the entries, wherein the attributes include a keyword and at least one language translation data; the keyword is configured for identifying a current entry, and the keyword is globally unique; and
obtaining the configured internationalized page.

According to one or more embodiments of the present application, after the persisting data in the configured internationalized page, the method further includes:
reading all the data in the micro-front-end main application during system initialization;
reading a language environment of the current system, and performing filtering according to the language environment and the data to obtain corresponding language translation data of each of the entries; and
combining the keyword with the corresponding language translation data of each of the entries to obtain combined entry data.

According to one or more embodiments of the present application, the reading the data and transmitting the data to at least one micro-front-end sub-application for any one of the micro-front-end sub-applications to perform page translation according to the data further includes:
transmitting the combined entry data to the micro-front-end sub-application during activation of the at least one micro-front-end sub-application; and
performing, during page loading of the micro-front-end sub-application, page translation according to the combined entry data.

According to one or more embodiments of the present application, the micro-front-end main application and the micro-front-end sub-application transmit data through a parameter transmission channel, and the parameter transmission channel includes props; and
the transmitting the combined entry data to the micro-front-end sub-application during activation of the at least one micro-front-end sub-application includes:
transmitting the combined entry data to the micro-front-end sub-application through the props during activation of the at least one micro-front-end sub-application.

According to one or more embodiments of the present application, the persisting data in the configured internationalized page includes at least one of:
storing the data in the configured internationalized page into a physical storage device, and storing the data in the configured internationalized page into a database.

According to one or more embodiments of the present application, the storing the data in the configured internationalized page into a physical storage device includes:
converting the data in the configured internationalized page into a json character string, and writing same into a file; and
storing the file into the physical storage device.

In a second aspect, the embodiments of the present application provide a micro-front-end-based page internationalization configuration apparatus. The above apparatus includes:
a control module, configured for creating an internationalized page in a micro-front-end main application, and configuring the internationalized page to obtain a configured internationalized page;

a management module, configured for persisting data in the configured internationalized page; and a transmission module, configured for reading the data and transmitting the data to at least one micro-front-end sub-application for any one of the micro-front-end sub-applications to perform page translation according to the data.

In a third aspect, the embodiments of the present application disclose an electronic device. The electronic device includes a memory and one or more processors; the memory stores computer-readable instructions, and the computer-readable instructions, when executed by the processors, cause the one or more processors to execute the steps of the micro-front-end-based page internationalization configuration method provided in any one of the above embodiments.

In a fourth aspect, the embodiments of the present application disclose one or more non-volatile computer-readable storage media for storing computer-readable instructions; and the computer-readable instructions, when executed by one or more processors, cause the one or more processors to execute the steps of the micro-front-end-based page internationalization configuration method provided in any one of the above embodiments.

Details of one or more embodiments of the present application will be proposed in the following accompanying drawings and descriptions. Other features and advantages of the present application will become apparent from the specification, the accompanying drawings and the claims.

BRIEF DESCRIPTION OF THE DRAWINGS

To describe the technical solutions in the embodiments of the present application more clearly, accompanying drawings required to be used in the embodiments will be briefly introduced below. Apparently, the drawings in the descriptions below are only some embodiments of the present application. Those of ordinary skill in the art also may obtain other drawings according to these drawings without creative work.

DETAILED DESCRIPTION

In order to make the objectives, technical solutions and advantages of the present application clearer, the technical solutions in the embodiments of the present application will be described clearly and completely below in combination with the drawings in the embodiments of the present application. Apparently, the embodiments described are part of the embodiments of the present application, not all the embodiments. Based on the embodiments in present application, all other embodiments obtained by those of ordinary skill in the art without creative work shall fall within the protection scope of the present application.

It should be understood that in the description of the present application, unless explicitly required by the context, similar words such as "including" and "containing" in the entire specification and claims should be interpreted as being inclusive rather than being exclusive or exhaustive. That is, it means "including but not limited to".

It should also be understood that the terms "first", "second", and the like are only for the purpose of description, and may not be understood as indicating or implying the relative importance. In addition, in the description of the present application, unless otherwise specified, "multiple" means two or more.

It should be noted that the terms "S1", "S2", and the like are only used for the purpose of describing the steps and do not refer to a sequence or an order, and are not used for limiting the present application. They are only for the convenience of describing the method of the present application and cannot be understood as indicating the order of steps. In addition, the technical solutions between the various embodiments may be combined with each other, but it should be based on what may be achieved by those of ordinary skill in the art. When the combination of technical solutions is contradictory or cannot be achieved, it should be considered that such a combination of technical solutions does not exist, and is not within the scope of protection claimed by the present application.

A micro front end is an architecture similar to microservice. The micro front end applies a concept of the microservice to a browser end, that is, transforming Web applications from a single monomer application into an application formed by aggregating multiple small front-end applications. Each front-end application may be independently run, developed, and deployed.

The micro front end includes one main application and a plurality of sub-applications. The main application only provides a general control function, does not provide a service function. The sub-applications provide service functions.

In some embodiments, the main application is basic engineering of many sub-applications in a micro-front-end architecture, and all other sub-applications are registered in the main application. In the main application, it is possible to control, according to a link address, deciding to activate which projects and which sub-applications. The sub-applications are activated or destroyed according to logic of the main application.

Figure 1:
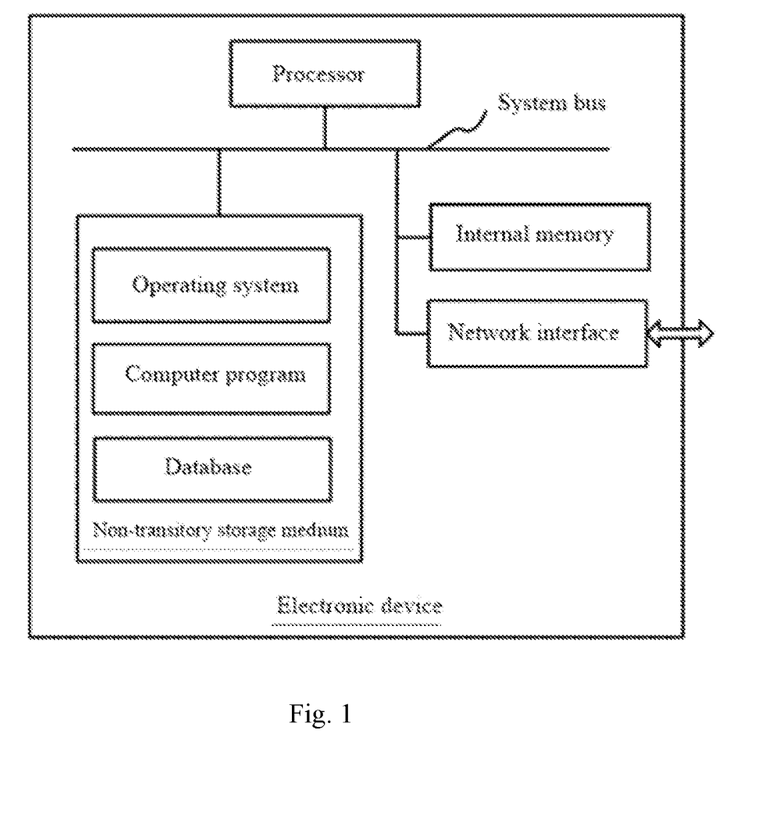
FIG. 1 is an internal structure diagram of an electronic device according to an embodiment of the present application.

A micro-front-end-based page internationalization configuration method provided in the present application may be applied to an electronic device. The electronic device may be a server, a diagram of an internal structure of the electronic device may be as shown in FIG. 1. The electronic device includes a processor, a memory, a network interface, and a database which are connected through a system bus. The processor of the electronic device is configured for providing computing and control capabilities. The memory of the electronic device includes a non-volatile storage medium and an internal memory. The non-volatile storage medium stores an operating system, computer-readable instructions, and the database. The internal memory provides an environment for running of the operating system and the computer-readable instructions in the non-volatile storage medium. The database of the electronic device is configured for storing data, such as data in the configured internationalized page. The network interface of the electronic device is configured for communicating with an external terminal through network connection. The computer-readable instructions are executed by a processor to implement the micro-front-end-based page internationalization configuration method. The server may be implemented as an independent server or as a server cluster composed of a plurality of servers.

Figure 2:
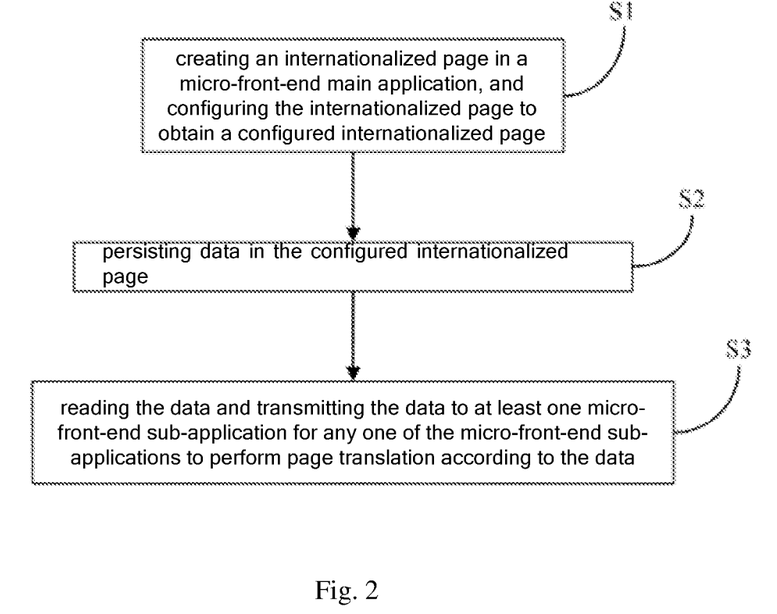
FIG. 2 is a general flow diagram of a micro-front-end-based page internationalization configuration method according to an embodiment of the present application.

The present application provides a micro-front-end-based page internationalization configuration method. Referring to FIG. 2, describing application of the method to the electronic device in FIG. 1 as an example. The method includes:

S1: creating an internationalized page in a micro-front-end main application, and configuring the internationalized page to obtain a configured internationalized page.

Figure 3:
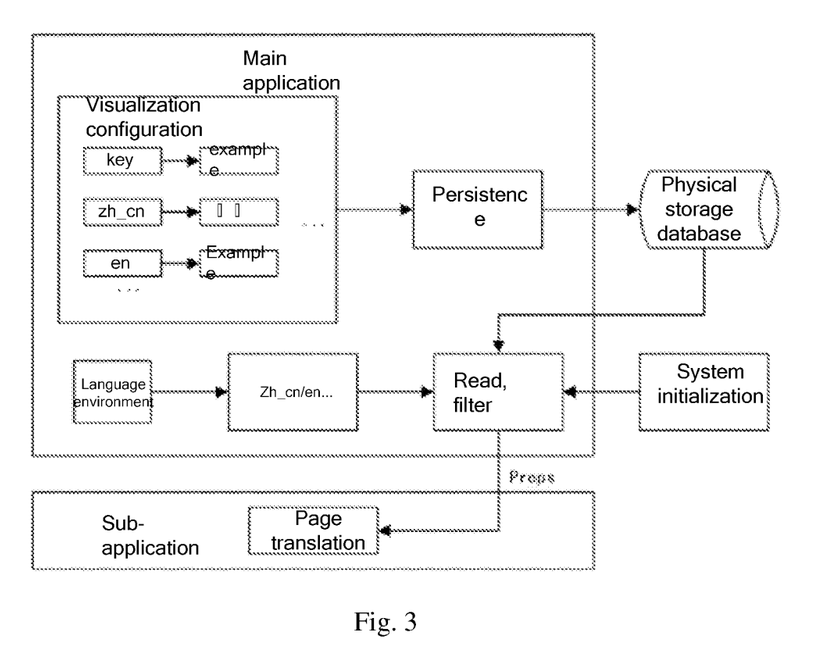
FIG. 3 is a schematic diagram of an implementation flow of the micro-front-end-based page internationalization configuration method according to an embodiment of the present application.

This embodiment will be exemplarily explained below in combination with FIG. 3.

In some embodiments, the internationalized page may include a visualized page. Visualized configuration may be performed on entries in the internationalized page of the micro-front-end main application. In a micro-front-end system, a code is more concise, which may avoid unnecessary coupling between unrelated components and achieve component decoupling, and a code is easier to maintain, thus achieving team autonomy. However, a significant increase in a team autonomy level may further divide work of each team. Each team focuses on its own service or platform functions. Overall delivery to users may lead to insensitivity to users' needs and reflections, and a delayed response. Moreover, there are lots of duplications in packages on which different sub-applications depend. Due to the independent development, compilation, and posting of respective applications, it is inevitable that there will be duplicate dependencies. Thus, this leads to repeated downloading of dependencies between different applications, which additionally increases low and a load on a server side.

In some embodiments, in a page internationalization scenario, each sub-application has its own internationalization configuration file, and different sub-applications may have duplicate configurations of same entry or inconsistent translations of the same entry. By creating and providing an internationalized page, entries may be directly configured on a visualized page of the main application, which achieves unified translation of the entries. Furthermore, modifying the entries does not need to perform code modification, repackaging, and redeployment, but requires page operations, which improves the development efficiency, makes it easy to maintain, and reduces the flow and the load on the server side.

In some implementations, S1 further includes:
S11: creating the internationalized page in the micro-front-end main application;
S12: acquiring at least one entry in the internationalized page, and configuring a plurality of attributes to each of the entries, wherein the attribute includes a keyword and at least one language translation data, the keyword is configured for identifying a current entry, and the keyword is globally unique; and
S13: obtaining the configured internationalized page.

In some embodiments, above entry is an internationalization configuration object in the page, and the above entry may include one or more words or fields, one or more groups of phrases, and one or more sentences.

Exemplarily, the keyword may include key, and the key is globally unique. The attributes may include key, zh_cn, en, and the like. The key is configured for identifying the current entry, zh_cn represents a Chinese translation corresponding to the current entry, and en represents an English translation corresponding to the current entry. If another language translation is required, attributes of the another language may be added, and names of the attributes may be customized according to this language.

S2: persisting data in the configured internationalized page.

In some embodiments, persistence is a mechanism that converts program data between a persistent state and a transient state. The persistence refers to storing the above data to a physical storage device or a database that may achieve permanent storage. The main application for the persistence is to store objects in the internal memory in the database, a disk file, an XML data file, or the like.

In some implementations, S2 includes at least one of:
storing the data in the configured internationalized page into a physical storage device, and storing the data in the configured internationalized page into a database.

The storing the data in the configured internationalized page into a physical storage device includes: converting the data in the configured internationalized page into a json character string, and writing the data into a file; and
storing the file into the physical storage device.

Exemplarily, the data in the configured internationalized page includes entry data, and the entry data may be converted into json character strings. For example: such a form {key: "example", zh_cn: "举例", en: "Example"} is written to a file. The file is then stored in the physical storage device. The entry data may also be stored in the database one by one. The entry data is subjected to persistence for subsequent reading.

In some implementations, after S2 is executed, the method further includes:
201: reading all the data in the micro-front-end main application during system initialization;
202: reading a language environment of the current system, and performing filtering according to the language environment and the data to obtain corresponding language translation data of each of the entries; and
203: combining the keyword with the corresponding language translation data of each of the entries to obtain combined entry data.

In some embodiments, in response to the system initialization, all the data is read in the micro-front-end main application.

In some embodiments, the system may include a browser, a server, and the like. The system initialization may include refreshing the browser, reloading a page, and the like. The system initialization may be performed when a language environment or a network environment is changed. In this case, page information needs to be reloaded, and the entry data needs to be read to translate and convert the page information.

Exemplarily, if it is recognized that a current language environment is Chinese, the entry data may be converted according to the current language environment (Chinese environment) to filter out attribute data information of other language environments and obtain a key: value format, that is, a key: zh_cn format. The entries and the keywords match the attributes corresponding to the current language environment (Chinese environment) separately, such as {example: "举例"}. By such technical means, transmission and processing of the attribute data information of other language environments unrelated to the current language environment may be reduced, thereby reducing computation burden and the load on the server side, and improving the translation conversion efficiency.

S3: reading the data and transmitting the data to at least one micro-front-end sub-application for any one of the micro-front-end sub-applications to perform page translation according to the data.

In some embodiments, the entry data is read from the above physical storage or database and is transmitted to other micro-front-end sub-applications. The micro-front-end sub-applications implement services on the entry data. The entry data is from a consistent source, and the converted page translations are consistent, so that the consistency of the page translations may be achieved. Each micro-front-end sub-application independently completes the page translation flow, achieving independent autonomy of teams.

In some implementations, S3 further includes:
S31: transmitting the combined entry data to the micro-front-end sub-application during activation of the at least one micro-front-end sub-application; and
S32: performing, during page loading of the micro-front-end sub-application, the page translation according to the combined entry data.

In some embodiments, the combined entry data is transmitted to the micro-front-end sub-application in response to the activation of the at least one micro-front-end sub-application. Page translation is performed according to the combined entry data in response to the page loading of the micro-front-end sub-application.

In some embodiments, the micro-front-end main application and the micro-front-end sub-applications transmit the data through a parameter transmission channel. The parameter transmission channel includes a props attribute. S31 further includes:
transmitting the combined entry data to the micro-front-end sub-application through the props during activation of the at least one micro-front-end sub-application.

In some embodiments, the combined entry data is transmitted to the micro-front-end sub-application through the props in response to the activation of the at least one micro-front-end sub-application.

In some embodiments, communication between parent and son components is props down, events up. The parent component, that is, the micro-front-end main application, transmits the entry data to the son component (the sub-application) through the attribute props, and the son component (the sub-application) sends a message to the parent component through the events.

Exemplarily, if a sub-application needs certain data, a prop attribute is defined internally, and then the parent component transmits its own data attribute to this attribute of the son component just like assigning a characteristic value to an html element.

In this embodiment, a visualized internationalized page is provided in the micro-front-end main application for developers to add or modify internationalization configurations, and data is persisted in the micro-front-end main application. When a sub-application is activated, the data is transmitted from the main application to the sub-application for page translation services of the sub-application. According to the above technical solutions, different sub-applications may add and maintain internationalized entries through a unified visualized page during development of internationalization functions, which ensures the uniqueness of entries at a code level and also ensures the translation uniformity of different sub-applications, thereby reducing the complexity of micro-front-end development. In addition, modifying entries in a production environment only requires interface operations, without performing code modification, repackaging, and redeployment, which greatly improves the development and maintenance efficiency.

Figure 4:
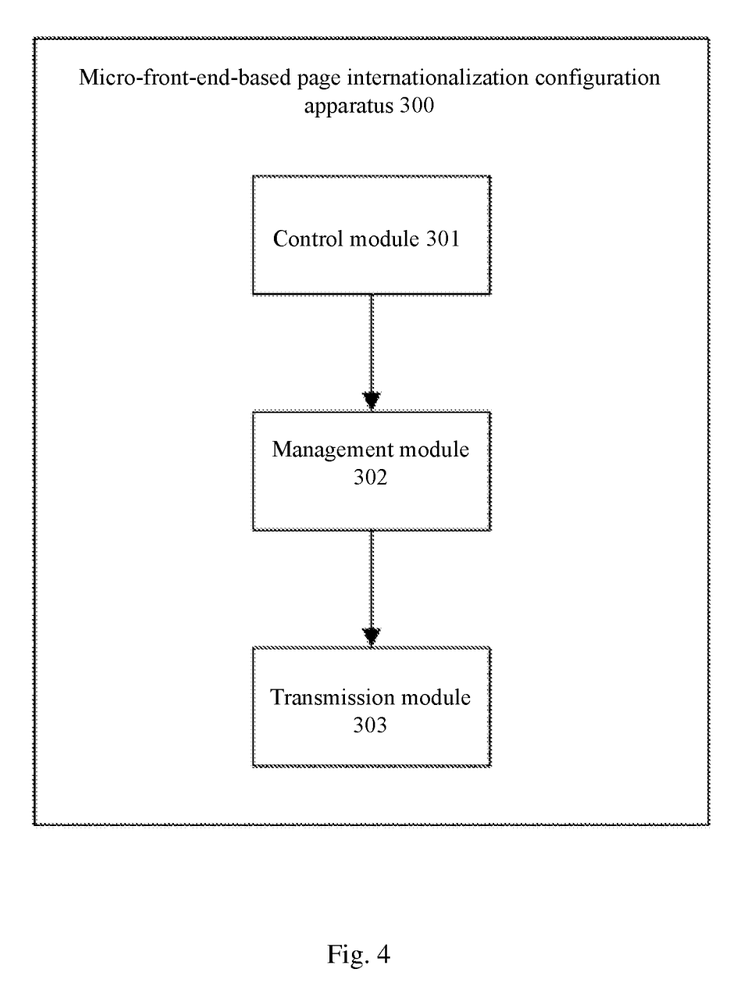
FIG. 4 is a schematic structural diagram of a micro-front-end-based page internationalization apparatus according to an embodiment of the present application.

Corresponding to the above embodiment, the present application further provides a micro-front-end-based page internationalization configuration apparatus 300, as shown in FIG. 4, including a control module 301, a management module 302, and a transmission module 303.

The control module 301 is configured for creating an internationalized page in a micro-front-end main application, and configuring the internationalized page to obtain a configured internationalized page; the management module 302 is configured for persisting data in the configured internationalized page; and the transmission module 303 is configured for reading the data and transmitting the data to at least one micro-front-end sub-application for any one of the micro-front-end sub-applications to perform page translation according to the data.

Further, the control module 301 is further configured for creating the internationalized page in the micro-front-end main application, and is configured for acquiring at least one entry from the internationalized page, and configuring a plurality of attributes to each of the entries, wherein the attributes include a keyword and at least one language translation data, the keyword is configured for identifying a current entry, and the keyword is globally unique; and the control module 301 is further configured for obtaining the configured internationalized page.

Further, the management module 302 is further configured for reading all the data in the micro-front-end main application during system initialization, and is configured for reading a language environment of the current system, and performing filtering according to the language environment and the data to obtain corresponding language translation data of each of the entries; and the management module 302 is further configured for combining the keyword with the corresponding language translation data of each of the entries to obtain combined entry data.

Further, the transmission module 303 is further configured for transmitting the combined entry data to the micro-front-end sub-application during activation of the at least one micro-front-end sub-application; and the management module 302 is configured for performing, during page loading of the micro-front-end sub-application, page translation according to the combined entry data.

Further, the transmission module 303 is further configured for transmitting the combined entry data to the micro-front-end sub-application through the props during activation of the at least one micro-front-end sub-application.

Further, the management module 302 is further configured for storing the data in the configured internationalized page into a physical storage device, and storing the data in the configured internationalized page into a database.

Further, the management module 302 is further configured for converting the data in the configured internationalized page into a json character string, and writing the data into a file; and storing the file into the physical storage device.

In this embodiment, a visualized internationalized page is provided in the micro-front-end main application for developers to add internationalization configurations or modify entry configuration information in the visualized interface or perform a series of operations such as maintenance, making it easy to maintain and improving the development efficiency. Meanwhile, the entry data is persisted into the physical storage or the database for reading and use by the micro-front-end sub-applications, which ensures the consistency of translations of the respective micro-front-end sub-applications.

Corresponding to the above embodiment, the present application further provides an electronic device. The electronic device includes a memory and one or more processors; the memory stores computer-readable instructions; and the computer-readable instructions, when executed by the processors, cause the one or more processors to execute the steps of the micro-front-end-based page internationalization configuration method provided in any one of the above embodiments.

Figure 5:
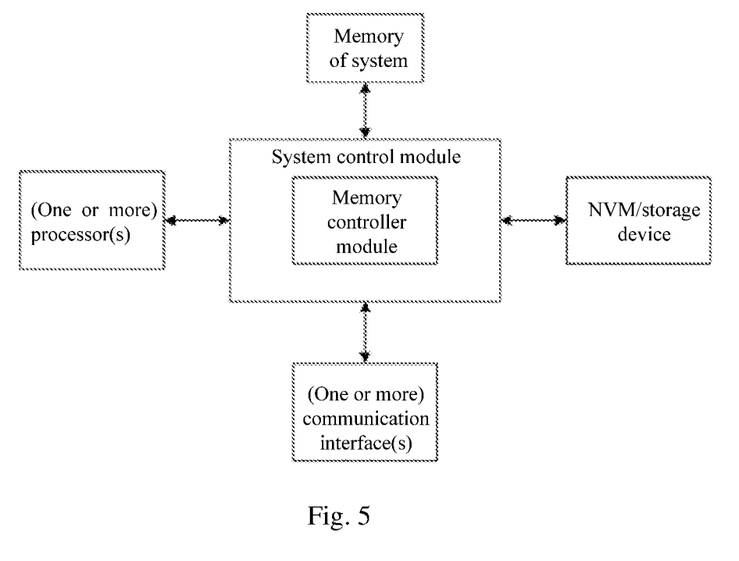
FIG. 5 is an exemplary system of respective embodiments that may be applied to implementing the present application.

As shown in FIG. 5, in some embodiments, the system may serve as any of the aforementioned electronic devices for implementing the micro-front-end-based page internationalization configuration method in each embodiment. In some embodiments, the system may include one or more computer-readable media with instructions (such as a system memory or a non-volatile memory (NVM)/storage device), and one or more processors (such as (one or more) processors) coupled to the one or more computer-readable media and configured for executing the instructions to implement modules to perform the actions described in the present application.

For one or more embodiments, a system control module may include any appropriate interface controller to provide any appropriate interface to at least one of the (one or more) processors and/or any appropriate device or component communicating with the system control module.

The system control module may include a memory controller module to provide an interface to the memory of the system. The memory controller module may be a hardware module, a software module, and/or a firmware module.

The memory of the system may be configured, for example, for loading and storing data and/or instructions for the system. For one or more embodiments, the memory of the system may include any appropriate volatile memory, such as an appropriate Dynamic Random Access Memory (DRAM). In some embodiments, the memory of the system may include a double data rate type quad synchronous dynamic random access memory (DDR4SDRAM).

For one or more embodiments, the system control module may include one or more input/output (I/O) controllers to provide interfaces to the NVM/storage device and the (one or more) communication interface(s).

For example, the NVM/storage device may be configured for storing data and/or instructions. The NVM/storage device may include any appropriate non-volatile memory (such as a flash memory) and/or may include any appropriate (one or more) non-volatile storage device(s) (such as one or more hard disk drives (HDDs), one or more optical disc (CD) drives, and/or one or more digital versatile disk (DVD) drives).

The NVM/storage device may include storage resources of a part of a device that is physically mounted as the system, or may be accessed by the device, instead of being a part of the device. For example, the NVM/storage device may be accessed by (one or more) communication interface(s) via a network.

The (one or more) communication interface(s) may provide an interface for the system to communicate with any other appropriate devices through one or more networks. The system may wirelessly communicate with one or more components of a wireless network according to any of one or more wireless network standards and/or protocols.

For one or more embodiments, at least one of the (one or more) processor(s) may be logically encapsulated with one or more controllers (for example, the memory controller module) of the system control module. For one or more embodiments, at least one of the (one or more) processor(s) may be logically encapsulated with one or more controllers of the system control module to form a system in package (SiP). For one or more embodiments, at least one of the (one or more) processor(s) may be logically integrated with one or more controllers of the system control module onto the same mold. For one or more embodiments, at least one of the (one or more) processor(s) may be logically integrated with one or more controllers of the system control module onto the same mold to form a system on chip (SoC).

In the various embodiments, the system may be, but is not limited to, a server, a workstation, a desktop computing device or a mobile computing device (for example, a laptop computing device, a handheld computing device, a tablet computer, and a netbook). In the various embodiments, the system may have more or fewer components and/or different architectures. For example, in some embodiments, the system includes one or more cameras, keyboards, liquid crystal display (LCD) screens (including touch screen displays) and non-volatile memory ports, a plurality of antennas, graphics chips, application specific integrated circuits (ASICs), and speakers.

It should be noted that the present application may be implemented in software and/or a combination of software and hardware, for example, using an ASIC, a general-purpose computer, or any other similar hardware devices. In one or more embodiments, a software program of the present application may be executed by a processor to achieve the steps or functions described above. Similarly, the software program (including related data structures) of the present application may be stored in a computer-readable recording medium, for example, a RAM, a magnetic or optical drive or a floppy disk and a similar device. In addition, some steps or functions of the present application may be implemented in hardware, for example, as a circuit that cooperates with the processor to execute the various steps or functions.

In addition, a part of the present application may be applied as a computer program product, such as a computer-readable instruction, which, when executed by a computer, may invoke or provide the methods and/or technical solutions according to the present application through operations of the computer. Those skilled in the art should understand that an existence form of the computer-readable instructions in computer-readable medium includes but is not limited to a source file, an executable file, and an installation package file. Correspondingly, ways of executing the computer-readable instructions by the computer include but are not limited to: The computer directly executes the instructions, or the computer compiles the instructions before executing a corresponding compiled program, or the computer reads and executes the instructions, or the computer reads and installs the instruction before executing a corresponding installed program. The computer-readable medium may be any available computer-readable storage medium or communication medium that may be accessed by the computer.

The communication medium includes a medium through which communication signals, such as computer-readable instructions, data structures, program modules, or other data, are transmitted from one system to another system. The communication medium may include a conductive transmission medium (such as a cable and a wire (such as an optical fiber and a coaxial cable)) and a wireless (non-conductive transmission) medium that may propagate energy waves, such as sounds, electromagnetic waves, RF waves, microwaves, and infrared rays. The computer-readable instructions, the data structures, the program modules, or other data may be embodied as modulated data signals in the wireless medium (such as carriers or similar mechanisms embodied as a part of a spread spectrum technology). The term "modulated data signal" refers to a signal in which one or more features are changed or set in a way that encodes information. Modulation may be an analog, digital, or hybrid modulation technology.

One or more embodiments according to the present application includes an apparatus. The apparatus includes a memory configured for storing computer-readable instructions and a processor configured for executing program instructions. When the computer-readable instructions are executed by the processor, the apparatus is triggered to operate the methods and/or technical solutions based on the multiple foregoing embodiments according to the present application.

Corresponding to the above embodiment, the present application further provides one or more non-volatile computer-readable storage media for storing computer-readable instructions; and the computer-readable instructions, when executed by one or more processors, cause the one or more processors to execute the steps of the micro-front-end-based page internationalization configuration method provided in any one of the above embodiments.

Those of ordinary skill in the art may understand that implementation of all or a part of the flows in the method of the foregoing embodiment may be completed by the computer-readable instructions that instruct relevant hardware. The computer-readable instructions may be stored in a non-volatile computer-readable storage medium. The computer-readable instructions may include the flows of the embodiments of the foregoing methods when executed. Any reference to the memory, the storage, the database or other media used in the embodiments provided by this application may include non-volatile and/or volatile memories. The non-volatile memories may include a read-only memory (ROM), a programmable ROM (PROM), an electrically programmable ROM (EPROM), an electrically erasable programmable ROM (EEPROM) or a flash memory. The volatile memories may include a random access memory (RAM) or an external cache. As an illustration but not a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct memory bus dynamic RAM (DRDRAM), and a memory bus dynamic RAM (RDRAM).

Although the embodiments of the present application have been described, those skilled in the art may make other changes and modifications to these embodiments once they acquire the basic creative concept. Therefore, the attached claims are intended to be explained as including the embodiments and all the changes and modifications that fall within the scope of the embodiments of the present application.

Apparently, those skilled in the art may make various changes and modifications to the present application without departing from the spirit and scope of the present application. Therefore, if these changes and modifications of the present application fall within the scope of the claims of the present application and equivalent technologies of the present application, the present application is intended to include these changes and modifications.

The invention claimed is:

1. A micro-front-end-based page internationalization configuration method, wherein the method comprises:
creating an internationalized page in a micro-front-end main application;
acquiring at least one entry from the internationalized page, and configuring a plurality of attributes to each of the at least one entry, wherein the plurality of attributes comprise a keyword and at least one language translation data, the keyword is configured for identifying a current entry, and the keyword is globally unique;
obtaining a configured internationalized page;
persisting data in the configured internationalized page; and
reading the data and transmitting the data to at least one micro-front-end sub-application for any one of the at least one micro-front-end sub-application to perform page translation according to the data;
wherein after the persisting data in the configured internationalized page, the method further comprises:
determining whether a browser is refreshed or whether a page is reloaded;
in response to a determination that the browser is refreshed or the page is reloaded, determining system initialization;
reading all the data in the micro-front-end main application in response to the system initialization;
recognizing a current language environment;
converting, according to the current language environment, a format of each of the at least one entry to filter out attribute data information of other language environments to obtain corresponding language translation data of each of the at least one entry; and
combining the keyword with the corresponding language translation data of each of the at least one entry to obtain combined entry data.

2. The micro-front-end-based page internationalization configuration method according to claim 1, wherein the reading the data and transmitting the data to at least one micro-front-end sub-application for any one of the at least one micro-front-end sub-application to perform page translation according to the data further comprises:
transmitting the combined entry data to the micro-front-end sub-application in response to activation of the at least one micro-front-end sub-application; and
performing, in response to page loading of the micro-front-end sub-application, the page translation according to the combined entry data.

3. The micro-front-end-based page internationalization configuration method according to claim 2, wherein the micro-front-end main application and the micro-front-end sub-application transmit the data through a parameter transmission channel, and the parameter transmission channel comprises props; and
the transmitting the combined entry data to the micro-front-end sub-application in response to activation of the at least one micro-front-end sub-application comprises:
transmitting the combined entry data to the micro-front-end sub-application through the props in response to the activation of the at least one micro-front-end sub-application.

4. The micro-front-end-based page internationalization configuration method according to claim 1, wherein the persisting data in the configured internationalized page comprises at least one of:
storing the data in the configured internationalized page into a physical storage device, or
storing the data in the configured internationalized page into a database.

5. The micro-front-end-based page internationalization configuration method according to claim 4, wherein the storing the data in the configured internationalized page into a physical storage device comprises:

converting the data in the configured internationalized page into a json character string, and writing the data into a file; and storing the file into the physical storage device.

6. An electronic device, comprising a memory and a processor and a computer program stored in the memory that is executed by the processor, wherein the processor, when executing the computer program, is configured to execute a micro-front-end-based page internationalization configuration method, comprising:

creating an internationalized page in a micro-front-end main application;

acquiring at least one entry from the internationalized page, and configuring a plurality of attributes to each of the at least one entry, wherein the plurality of attributes comprise a keyword and at least one language translation data, the keyword is configured for identifying a current entry, and the keyword is globally unique;

obtaining a configured internationalized page;

persisting data in the configured internationalized page; and reading the data and transmitting the data to at least one micro-front-end sub-application for any one of the at least one micro-front-end sub-application to perform page translation according to the data;

wherein the processor, when executing the computer program, is configured to execute after the persisting data in the configured internationalized page, further operations comprising:

determining whether a browser is refreshed or whether a page is reloaded;

in response to a determination that the browser is refreshed or the page is reloaded, determining system initialization;

reading all the data in the micro-front-end main application in response to the system initialization;

recognizing a current language environment;

converting, according to the current language environment, a format of each of the at least one entry to filter out attribute data information of other language environments to obtain corresponding language translation data of each of the at least one entry; and combining the keyword with the corresponding language translation data of each of the at least one entry to obtain combined entry data.

7. A non-transitory computer-readable storage media, storing computer-readable instructions, wherein the computer-readable instructions are configured to execute a micro-front-end-based page internationalization configuration method, comprising:

creating an internationalized page in a micro-front-end main application;

acquiring at least one entry from the internationalized page, and configuring a plurality of attributes to each of the at least one entry, wherein the plurality of attributes comprise a keyword and at least one language translation data, the keyword is configured for identifying a current entry, and the keyword is globally unique;

obtaining a configured internationalized page;

persisting data in the configured internationalized page; and reading the data and transmitting the data to at least one micro-front-end sub-application for any one of the at least one micro-front-end sub-application to perform page translation according to the data;

wherein the computer-readable instructions are configured to execute after the persisting data in the configured internationalized page, further operations comprising:

determining whether a browser is refreshed or whether a page is reloaded;

in response to a determination that the browser is refreshed or the page is reloaded, determining system initialization;

reading all the data in the micro-front-end main application in response to the system initialization;

recognizing a current language environment;

converting, according to the current language environment, a format of each of the at least one entry to filter out attribute data information of other language environments to obtain corresponding language translation data of each of the at least one entry; and combining the keyword with the corresponding language translation data of each of the at least one entry to obtain combined entry data.

8. The micro-front-end-based page internationalization configuration method according to claim 1, wherein the acquiring at least one entry from the internationalized page comprises:

performing visualized configuration on the at least one entry from the internationalized page.

9. The micro-front-end-based page internationalization configuration method according to claim 1, wherein the creating an internationalized page in a micro-front-end main application comprises:

creating the internationalized page in the micro-front-end main application; and obtaining an internationalization configuration object from the internationalized page, wherein the internationalization configuration object comprises one or more words or fields, one or more groups of phrases, and one or more sentences.

10. The micro-front-end-based page internationalization configuration method according to claim 1, wherein the configuring a plurality of attributes to each of the at least one entry comprises:

determining names of the plurality of attributes according to a language corresponding to each of the at least one entry.

11. The micro-front-end-based page internationalization configuration method according to claim 1, wherein after the persisting data in the configured internationalized page, the method further comprises:

storing object in an internal memory into a database, a disk file, or an extensible markup language (XML) data file.

12. The micro-front-end-based page internationalization configuration method according to claim 4, wherein the storing the data in the configured internationalized page into a database comprises:

obtaining a plurality of entry data from the configured internationalized page; and storing the plurality of entry data in the database one by one.

13. The micro-front-end-based page internationalization configuration method according to claim 2, wherein the transmitting the combined entry data to the micro-front-end sub-application in response to activation of the at least one micro-front-end sub-application comprises:

transmitting the combined entry data to the micro-front-end sub-application through a parameter transmission channel in response to the activation of the at least one micro-front-end sub-application.

14. The micro-front-end-based page internationalization configuration method according to claim 13, wherein the parameter transmission channel comprises a props attribute, and the transmitting the combined entry data to the micro-front-end sub-application through a parameter transmission channel in response to the activation of the at least one micro-front-end sub-application comprises:
   transmitting the combined entry data to the micro-front-end sub-application through props down in response to the activation of the at least one micro-front-end sub-application.

15. The micro-front-end-based page internationalization configuration method according to claim 14, wherein the transmitting the combined entry data to the micro-front-end sub-application through a parameter transmission channel in response to the activation of the at least one micro-front-end sub-application comprises:
   transmitting a data attribute of the micro-front-end main application to the props attribute to transmit the combined entry data to the micro-front-end sub-application in response to the activation of the at least one micro-front-end sub-application.

16. The micro-front-end-based page internationalization configuration method according to claim 1, wherein after the creating an internationalized page in a micro-front-end main application, the method further comprises:
   modifying the at least one entry in a production environment by page operations on the internationalized page.

* * * * *